(12) United States Patent
Yanagihara

(10) Patent No.: US 8,947,597 B2
(45) Date of Patent: Feb. 3, 2015

(54) VIDEO REPRODUCING DEVICE, CONTROLLING METHOD OF VIDEO REPRODUCING DEVICE, AND CONTROL PROGRAM PRODUCT

(71) Applicant: Kabushiki Kaisha Toshiba, Minato-ku, Tokyo (JP)

(72) Inventor: Masahide Yanagihara, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/147,368

(22) Filed: Jan. 3, 2014

(65) Prior Publication Data
US 2015/0002740 A1  Jan. 1, 2015

(30) Foreign Application Priority Data
Jun. 27, 2013  (JP) .................... 2013-135005

(51) Int. Cl.
*H04N 9/475* (2006.01)
*H04N 5/60* (2006.01)
*H04N 9/64* (2006.01)
*H04N 5/04* (2006.01)

(52) U.S. Cl.
CPC ............... *H04N 9/646* (2013.01); *H04N 5/04* (2013.01); *H04N 5/602* (2013.01)
USPC ........................... 348/515; 348/738

(58) Field of Classification Search
USPC ......... 348/512, 515, 625, 645, 649, 650, 687, 348/738, 462, 480–485, 722, 632, 633
IPC ...................................... H04N 5/60,7/08, 9/475
See application file for complete search history.

(56) References Cited

U.S. PATENT DOCUMENTS

| | | | | |
|---|---|---|---|---|
| 5,548,346 | A * | 8/1996 | Mimura et al. ............. | 348/738 |
| 7,830,453 | B2 * | 11/2010 | Lim ............................ | 348/515 |
| 7,961,258 | B2 * | 6/2011 | Lee et al. ................... | 348/738 |
| 2010/0053448 | A1 | 3/2010 | Naka | |

FOREIGN PATENT DOCUMENTS

| | | |
|---|---|---|
| JP | 2008-118374 A | 5/2008 |
| JP | 2008-205684 A | 9/2008 |
| JP | 2012-501505 A | 1/2012 |
| WO | WO 2010/025457 A1 | 3/2010 |

\* cited by examiner

*Primary Examiner* — Sherrie Hsia
(74) *Attorney, Agent, or Firm* — Knobbe, Martens, Olson & Bear LLP

(57) ABSTRACT

According to one embodiment, a video reproducing device includes a separation controller and a processor. The separation controller is configured to receive a video signal and an audio signal synchronized with the video signal, and to separate a background sound and a voice in the audio signal. The processor is configured to select at least one of a plurality of image quality improvement processing schemes based on an analysis of the voice and the background sound, and to apply the selected image quality improvement processing scheme to the video signal.

4 Claims, 3 Drawing Sheets

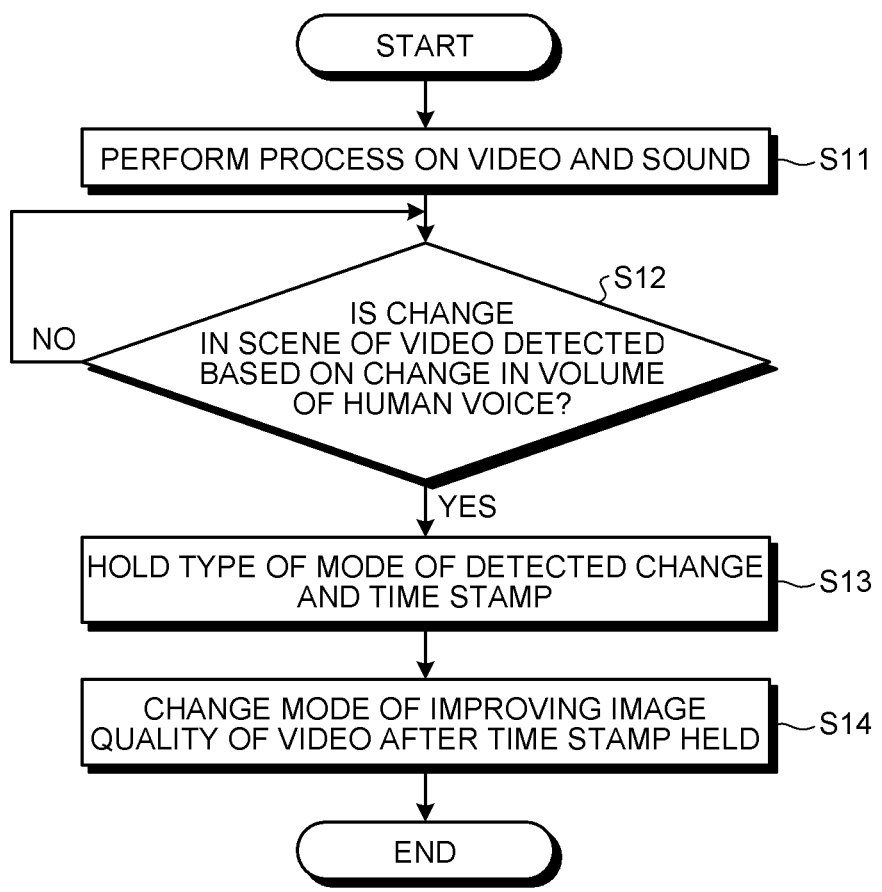

VIDEO REPRODUCING DEVICE, CONTROLLING METHOD OF VIDEO REPRODUCING DEVICE, AND CONTROL PROGRAM PRODUCT

CROSS-REFERENCE TO RELATED APPLICATIONS

This application is based upon and claims the benefit of priority from Japanese Patent Application No. 2013-135005, filed Jun. 27, 2013, the entire contents of which are incorporated herein by reference.

FIELD

Embodiments described herein relate generally to a video reproducing device, a controlling method of the video reproducing device, and a control program product.

BACKGROUND

Currently, video reproducing devices such as television sets, DVD players (DVD recorders), and Blu-ray (registered trademark) disc players (Blu-ray disc recorders) employ image quality improvement techniques for improving image quality in reproducing videos.

Examples of the image quality improvement techniques include edge enhancement for sharpening edges in a video, texture restoration for improving visualization of detailed portions in a video, noise removal, and color correction.

However, according to the conventional techniques, although there are methods for improving image quality depending on panel types or user's specifications, there exists a drawback in which it is difficult to appropriately improve the image quality dynamically with respect to each scene.

Furthermore, except for up-convert processing, the conventional techniques result in adverse effects depending on a video image, thereby it is difficult to apply an appropriate image quality improvement technique to the video image at the time.

For example, in order to clearly display an image of a human face, the color correction or the edge enhancement is effective; however, there is a drawback in which the noise removal or the texture restoration may cause adverse effects.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary schematic flowchart illustrating processing in the signal processor in the embodiment.

DETAILED DESCRIPTION

In general, according to one embodiment, a video reproducing device comprises a separation controller and a processor. The separation controller is configured to receive a video signal and an audio signal synchronized with the video signal, and to separate a background sound and a voice in the audio signal. The processor is configured to select at least one of a plurality of image quality improvement processing schemes based on an analysis of the voice and the background sound, and to apply the selected image quality improvement processing scheme to the video signal.

Hereinafter, an embodiment is explained with reference to the drawings.

Figure 1:
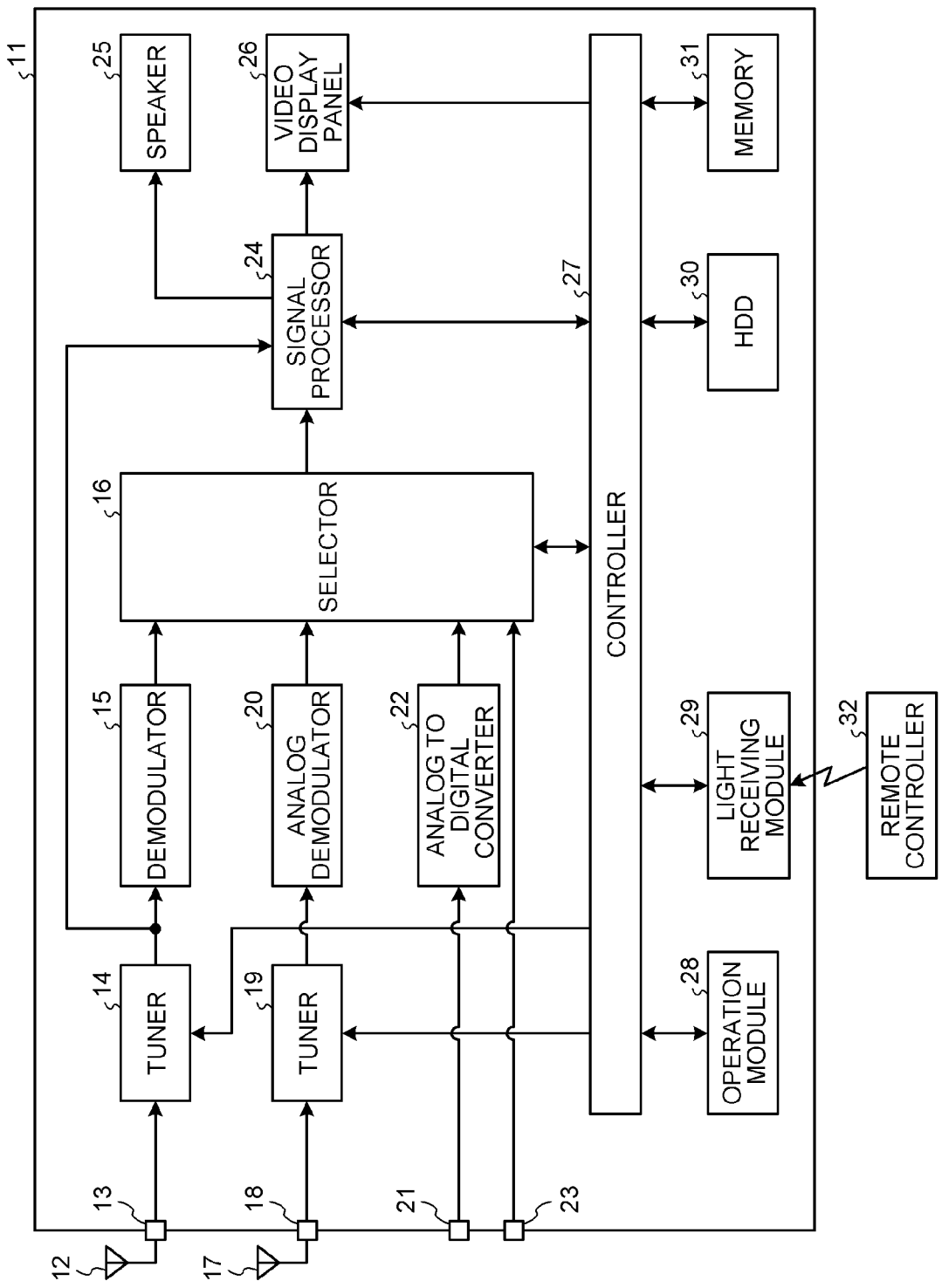
FIG. 1 is an exemplary schematic block diagram illustrating a configuration of a television-broadcasting receiver of a video reproducing device according to an embodiment.

FIG. 1 is a block diagram illustrating a schematic configuration of a television-broadcasting receiver according to an embodiment of a video reproducing device.

A television-broadcasting receiver 11 is a floor-standing type video display device that receives broadcast waves of analog broadcasting and broadcast waves of digital broadcasting, and displays videos of programs by using video signals extracted from the respective received broadcast waves.

The television-broadcasting receiver 11 has an antenna 12, an input terminal 13, a tuner 14, and a demodulator 15.

The antenna 12 receives broadcast waves of the digital broadcasting, and supplies broadcast signals of the broadcast waves to the tuner 14 via the input terminal 13.

The tuner 14 selects a broadcast signal of a desired channel from the broadcast signals of the digital broadcasting input thereto.

The broadcast signal output from the tuner 14 is supplied to the demodulator 15. The demodulator 15 applies demodulation processing to the broadcast signal, demodulates a digital video signal and an audio signal, and supplies the demodulated signals to a selector 16 described later.

Furthermore, the television-broadcasting receiver 11 has an antenna 17, an input terminal 18, a tuner 19, and an analog demodulator 20.

The antenna 17 receives broadcast waves of the analog broadcasting, and supplies broadcast signals of the broadcast waves to the tuner 19 via the input terminal 18.

The tuner 19 selects a broadcast signal of a desired channel from the broadcast signals of the analog broadcasting input thereto.

The broadcast signal output from the tuner 19 is demodulated by the analog demodulator 20. The demodulated broadcast signal is converted into a digital signal. The converted digital signal is then output to the selector 16.

Furthermore, the television-broadcasting receiver 11 has input terminals 21 and 23, an analog to digital converter 22, a signal processor 24, a speaker 25, and a video display panel 26.

The input terminal 21 receives an analog video signal and an analog audio signal input from the outside. The input terminal 23 receives a digital video signal and a digital audio signal input from the outside. The Analog to digital converter 22 converts the analog video signal and the analog audio signal that are supplied from the input terminal 21 into digital signals, and supplies the digital signals to the selector 16.

The selector 16 selects one of the digital and audio signals supplied from the demodulator 15, the analog demodulator 20, the analog to digital converter 22, and the input terminal 23, and supplies the selected signal to the signal processor 24.

The signal processor 24 applies predetermined signal processing, scaling processing or the like to the video signal input thereto, and supplies the processed video signal to the video display panel 26. Furthermore, the signal processor 24 applies predetermined signal processing to the digital audio signal input thereto, converts the digital audio signal into an analog audio signal, and outputs the analog audio signal to the speaker 25. Here, as specifically described later, the signal processor 24 comprises a configuration illustrated in FIG. 2. Furthermore, the television-broadcasting receiver 11 has at least a TS demultiplexer and an MPEG decoder that are not illustrated in FIGS. 1 and 2, and a signal after being decoded by the MPEG decoder is input to the signal processor 24 illustrated in FIG. 2.

In addition, the signal processor 24 generates an on screen display (OSD) signal to be displayed on the video display panel 26.

The speaker 25 receives the audio signal supplied from the signal processor 24 and outputs sounds by using the audio signal.

Furthermore, the video display panel 26 is comprised of a flat panel display such as a liquid crystal display or a plasma display. The video display panel 26 displays thereon videos by using the video signals supplied from the signal processor 24. In the present embodiment, the video display panel 26 can display videos with high resolution, as described later.

In addition, the television-broadcasting receiver 11 has a controller 27, an operation module 28, a light receiving module 29, a hard disk drive (HDD) 30, and a memory 31.

The controller 27 comprehensively controls various operations in the television-broadcasting receiver 11. The controller 27 is a microprocessor in which a central processing unit (CPU) or the like is incorporated. The controller 27 receives operation information from the operation module 28 while the controller 27 receives operation information transmitted from a remote controller 32 via the light receiving module 29 thus controlling each module based on the operation information.

In this case, the controller 27 uses the memory 31. The memory 31 mainly has a read only memory (ROM) storing therein a control program executed by the CPU incorporated in the controller 27, a random access memory (RAM) for providing a work area to the CPU, and a nonvolatile memory storing therein various kinds of setting information, control information, and the like.

The HDD 30 has a function as a storage module for storing therein the digital video signal and the audio signal that are selected in the selector 16. The television-broadcasting receiver 11 has the HDD 30, and can store in the HDD 30 the digital video signal and the audio signal that are selected in the selector 16. Furthermore, the television-broadcasting receiver 11 can reproduce videos and sounds by using the digital video signal and the audio signal that are stored in the HDD 30.

Figure 2:
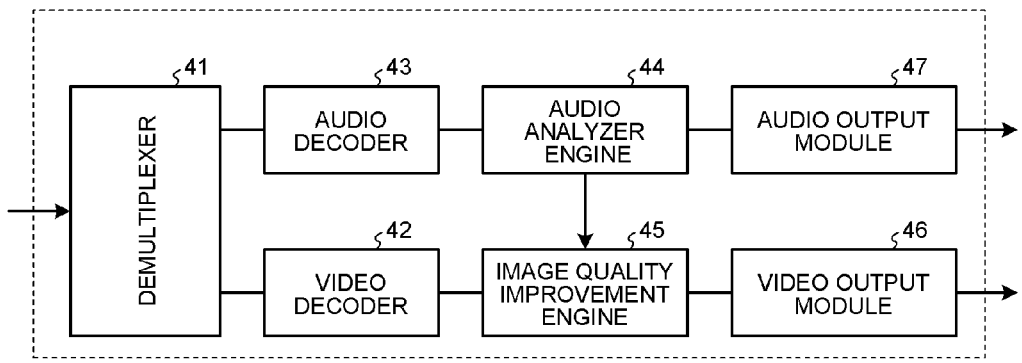
FIG. 2 is an exemplary schematic block diagram illustrating a configuration of a signal processor in the embodiment.

FIG. 2 is a schematic block diagram illustrating a configuration of the signal processor.

The signal processor 24 comprises: a demultiplexer 41; a video decoder 42; an audio decoder 43; an audio analyzer engine 44; an image quality improvement engine 45; a video output module 46; and an audio output module 47. The demultiplexer 41 separates audio data and video data from a stream. The video decoder 42 decodes the video data, and outputs the decoded data as an analog video signal. The audio decoder 43 decodes the audio data, and outputs the decoded data as an analog audio signal. The audio analyzer engine 44 separates background sounds and voices from the audio data, and analyzes the data based on the analog audio signal which is a result of decoding by the audio decoder 43. Further, the audio analyzer engine 44 at the same time outputs (through-outputs) the analog audio signal as it is. The image quality improvement engine 45 applies an image quality improvement technique to the analog video signal based on the result of analysis by the audio analyzer engine 45 and also on the analog video signal that is a result of decoding the video data.

The video output module 46 converts the analog video signal to which the image quality improvement technique is applied into data of a format displayable on the video display panel 26. Then, the video output module 46 outputs the data to the video display panel 26. The audio output module 47 applies processing such as various kinds of effects (equalizing or the like) to the analog audio signal input therein. Then, the audio output module 47 amplifies the signal by using an amplifier (not illustrated in the drawings), and outputs the signal to a speaker 35.

Here, the audio analyzer engine 44 is explained in detail.

Figure 3:
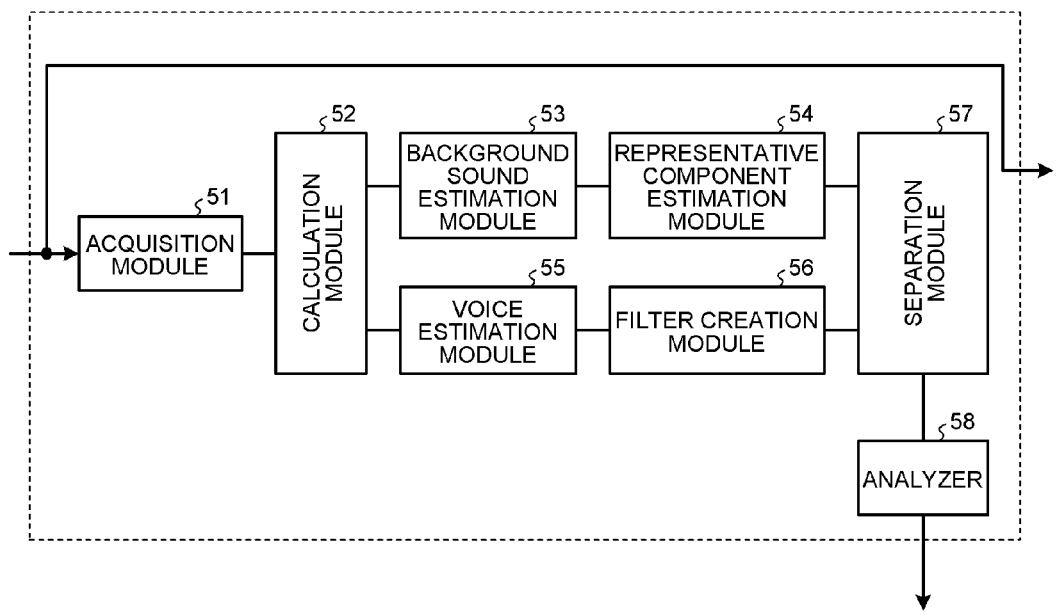
FIG. 3 is an exemplary schematic block diagram illustrating a functional configuration of an audio analyzer engine in the embodiment.

FIG. 3 is a schematic block diagram illustrating a functional configuration of the audio analyzer engine.

FIG. 4 is a schematic flowchart illustrating processing in the signal processor.

The signal processor 24 performs processing on a video and a sound (S11).

First, operations of the audio analyzer engine 44 are briefly explained.

The audio analyzer engine 44 estimates an unsteady background sound component by using a feature quantity acquired from the analog audio signal (acoustic signal) input therein. In estimating the background sound component, the audio analyzer engine 44 uses a background-sound base matrix estimated with the use of a few feature quantities acquired within a certain period of past time.

In addition to the estimated background sound component, a background-sound representative component representing the background sound components within a certain period of time is estimated by using the background sound components estimated within a certain period of time. Furthermore, the acquired feature quantity is used to estimate a voice component. The estimated voice component and representative component are used to create a filter for extracting the spectrum of the voice or the background sound. The filter created and the spectrum of the acoustic signal are used to perform separation into a voice signal and a background signal.

In this manner, the audio analyzer engine 44 in the present embodiment performs separation based on the representative component estimated by using a first background sound component estimated in the past. This can improve a drawback with respect to a residual background sound spectrum in a voice spectrum.

The audio analyzer engine 44 is provided with an acquisition module 51, a calculation module 52, a background sound estimation module 53, a representative component estimation module 54, a voice estimation module 55, a filter creation module 56, a separation module 57, and an analyzer 58.

The acquisition module 51 performs a frequency analysis on the acoustic signal containing the voice signal and the background sound signal, and acquires the feature quantity of the analog audio signal (acoustic signal). Here, the acquisition module 51 may be configured to acquire a feature quantity acquired by the frequency analysis or the like in an external device.

The calculation module 52 uses the feature quantities acquired within a certain period of time to calculate the background-sound base matrix expressing a background sound.

The background sound estimation module 53 uses the feature quantities acquired and the calculated background-sound base matrix to estimate a unsteady background sound component from among the background sound components of the feature quantities.

The representative component estimation module 54 estimates a representative component of the background sound components within a certain period of time from background sound components estimated by one or more feature quantities. Here, the feature quantities are acquired within a certain period of time including the past.

The voice estimation module 55 uses a feature quantity acquired to estimate a voice component that is a voice component of the feature quantity.

The filter creation module 56 creates a filter for extracting a voice spectrum or a background-sound spectrum from the estimated voice component and representative component of the background sound component.

The separation module 57 separates the voice signal and the background sound signal from the analog audio signal (acoustic signal) by using the filter and the spectrum of the analog audio signal (acoustic signal).

The analyzer 58 outputs an image quality improvement control signal to the image quality improvement engine based on the voice signal and the background sound signal that are separated from the analog audio signal.

To be more specific, the analyzer 58 determines, based on the voice signal and the background sound signal that are separated from the analog audio signal, whether a display content of a video to be displayed changes based on a change in volume of a human voice; that is, whether a scene in the video changes (S12).

The following aspects of changes in scene of the video are conceivable, for example.

(1) When the volume of a human voice (voice signal) in a video relatively increases compared with the volume of other sounds (background sound signal), it is determined that a human face is displayed in the scene of the video. Accordingly, a mode is specified such that image quality improvement control data should be output to the image quality improvement engine so as to perform color adjustment to make the color of human skin finely viewable.

(2) In the same manner as above, when the volume of a human voice (voice signal) in a video relatively increases compared with the volume of other sounds (background sound signal), it is determined that a human face is displayed in the scene of the video. Accordingly, a mode is specified such that image quality improvement control data should be output to the image quality improvement engine so as to perform edge enhancement to make the contour of a human face clearly visible.

(3) In addition, when the volume of a human voice (voice signal) in a video relatively increases compared with the volume of other sounds (background sound signal), it is determined that a human face is displayed in the scene of the vide. Accordingly, a mode is specified such that image quality improvement control data should be output to the image quality improvement engine so as to perform brightness adjustment to increase the brightness of an entire display screen.

(4) When the volume of a human voice (voice signal) in a video relatively decreases compared with the volume of other sounds (background sound signal), it is determined that a display size of a human (person) is smaller compared with the size of the entire display screen or a human (person) is not displayed. Accordingly, a mode is specified such that image quality improvement control data should be output to the image quality improvement engine so as to perform texture restoration to make details in a video image easily visible.

In the determination operation at S12, based on the sound signal and the background sound signal that are separated, when the display content of the video to be displayed has not changed by the change in volume of a human voice (No at S12), the flow is put in the waiting state and the determination operation at S12 is repeated.

In the determination operation at S12, based on the sound signal and the background sound signal that are separated, when the display content of the video to be displayed has changed by the change in volume of the human voice (Yes at S12), the analyzer 58 holds a type of a mode of change in scene of the video that is detected and a time stamp corresponding to the reproduction timing of the video (S13).

Furthermore, the analyzer 58 outputs the image quality improvement control data to the image quality improvement engine 45 so that the mode of improving the image of the video after the time stamp held is changed in the image quality improvement engine.

The image quality improvement engine 45 holds the image quality improvement control data to change, based on a time stamp corresponding to the image quality improvement control data held, the mode of improving the image quality after a reproduction time corresponding to the time stamp (S14).

As a result of the processing described above, appropriate image quality improvements can be dynamically performed for each video display content (scene) without bothering a user or making the user specify improvement of the image quality.

Furthermore, by determining further detailed video display content (scene), optimum image quality improvements can be performed.

The video reproducing device in the present embodiment is provided with a controller such as a CPU, a storage module such as a read only memory (ROM) and an RAM, an external storage device such as an HDD and a CD drive, a display device such as a display panel, and an input device such as a keyboard and a mouse, and may adopt a hardware configuration using an ordinary computer.

The control program executed in the video reproducing device of the present embodiment may be provided in the form of the storage medium capable of being read by a computer; that is, a CD-ROM, a flexible disk (FD), a CD-R, a digital versatile disk (DVD), or the like in which the program is stored in an installable or executable file.

Furthermore, the control program executed in the video reproducing device of the present embodiment may be stored on a computer connected to a network such as the Internet and provided by downloading via the network. The control program executed in the video reproducing device of the present embodiment may be provided or distributed via a network such as the Internet.

In addition, the control program executed in the video reproducing device of the present embodiment may be provided in the form of a read only memory (ROM) or the like into which the program is integrated in advance.

The control program executed in the video reproducing device of the present embodiment is constituted of modules comprising the above-mentioned respective modules (the separation module, the estimation module, the processor, and the like). As actual hardware, a processor (CPU) reads out the control program from the above-mentioned storage medium and executes the control program, so that the above-mentioned respective modules are loaded on a main storage module, and the separation module, the estimation module, the processor, and the like are generated on the main storage module.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video reproducing device comprising:
a separation controller configured to receive a video signal and an audio signal synchronized with the video signal, and to separate a background sound and a voice in the audio signal; and
a processor configured to select at least one of a plurality of image quality improvement processing schemes based on an analysis of the voice and the background sound, and to apply the selected image quality improvement processing scheme to the video signal, wherein
the analysis of the voice and the background is based on a relative relation between the voice and the background sound,
the relative relation comprises a change in loudness of the voice relative to the loudness of the background sound, and,
when it is determined that the change in the loudness comprises a relative increase of the loudness of the voice compared with the loudness of the background sound, edge enhancement processing is selected as the image quality improvement processing scheme.

2. The video reproducing device of claim 1, wherein, when it is determined that the change in the loudness comprises a relative decrease of the loudness of the voice compared with the loudness of the background sound, texture restoration processing is selected as the image quality improvement processing scheme.

3. A method for controlling a video reproducing device, the method being performed in the video reproducing device configured to perform reproduction of a video signal and an audio signal synchronized with the video signal, the method comprising:

receiving the video signal and the audio signal synchronized with the video signal;
isolating a background sound and a voice in the audio signal;
analyzing the voice and the background sound;
selecting an image quality improvement processing scheme based on the analysis; and
applying the selected image quality improvement processing scheme to the video, wherein the analyzing is based on a relative relation between the voice and the background sound the relative relation comprises a change in loudness of the voice relative to the loudness of the background sound, and,
when it is determined that the change in the loudness comprises a relative increase of the loudness of the voice compared with the loudness of the background sound, edge enhancement processing is selected as the image quality improvement processing scheme.

4. A computer program product having a non-transitory computer readable medium including programmed instructions, wherein the instructions, when executed by a computer, cause the computer to control a video reproducing device configured to perform reproduction of a video signal and an audio signal synchronized with the video signal and perform:
receiving the video signal and the audio signal;
separating a background sound and a voice in the audio signal;
predicting a type of image within the video signal based on an analysis of the voice and the background sound;
selecting at least one image quality improvement processing scheme based on the type of image; and
applying the selected image quality improvement processing scheme to the video, wherein
the analyzing is based on a relative relation between the voice and the background sound the relative relation comprises a change in loudness of the voice relative to the loudness of the background sound, and,
when it is determined that the change in the loudness comprises a relative increase of the loudness of the voice compared with the loudness of the background sound, edge enhancement processing is selected as the image quality improvement processing scheme.

* * * * *